(12) United States Patent
Liang

(10) Patent No.: US 6,485,147 B2
(45) Date of Patent: Nov. 26, 2002

(54) PROJECTION SYSTEM AND METHOD OF AUTOMATIC FOCUS

(75) Inventor: Don Liang, Jungli (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/000,561

(22) Filed: Oct. 23, 2001

(65) Prior Publication Data
US 2002/0063852 A1 May 30, 2002

(30) Foreign Application Priority Data
Nov. 29, 2000 (TW) .................................. 089125297 A

(51) Int. Cl.[7] .............................................. G03B 21/14
(52) U.S. Cl. ...................................... 353/101; 353/98
(58) Field of Search .................................. 353/101, 100, 353/121, 98, 99; 359/432, 676, 683, 694, 698; 348/745, 805

(56) References Cited

U.S. PATENT DOCUMENTS

| | | | | |
|---|---|---|---|---|
| 3,813,155 A | * | 5/1974 | Szymber et al. ............ 353/101 |
| 5,400,093 A | * | 3/1995 | Timmers ..................... 353/101 |
| 5,479,225 A | * | 12/1995 | Kuga .......................... 353/101 |
| 5,537,168 A | * | 7/1996 | Kitagishi et al. ........... 353/101 |

FOREIGN PATENT DOCUMENTS

JP 11-119185 4/1999

* cited by examiner

*Primary Examiner*—William Dowling
(74) *Attorney, Agent, or Firm*—Ladas & Parry

(57) ABSTRACT

A projection system includes a total reflection element, an image reader, an analysis system and a server device. The image reader reads a projective image guided by the optical projection device and the total reflection element and outputs a read signal. The analysis system analyzes the read image by an evaluation function and determines the clearest image on the projective plane so as to output an adjustment signal. The server device automatically performs the focal adjustment to the optical projection device based on the adjustment signal.

16 Claims, 9 Drawing Sheets

PROJECTION SYSTEM AND METHOD OF AUTOMATIC FOCUS

BACKGROUND OF THE INVENTION

1. Field of the Invention

The invention relates to a projection system capable of automatic focus adjustment. In particular, the invention relates to a projection system that automatically adjusts the projection focus by an evaluation function applied in projective image analysis.

2. Description of the Related Art

Traditionally, projection systems have relied on the user's visual assessment to adjust the focus of the projected image.

FIG. 1 shows a schematic diagram of the automatic focal adjustment device of a typical LCD projection system. In a Japan Patent Laying Open Hei No. 11-119185, as shown in FIG. 1, three LCD display devices 1400r, 1400g and 1400b respectively produce red, green and blue images through a cross prism 4000 to form a color image. The color image passes through a semitransparent reflective device 3000 to form images on the screen s through a projective lens 1000. The image on the screen s is reflected on an optical receiving device 500 through the semitransparent reflective device 3000. Further, a signal generation device 1600, a control device 9000, an operation device 8000 and a focus adjustment/control device 6000 are used to analyze and compare each image on the focal position of the projective lens 1000. However, as such, a semitransparent reflective device is required, which increases the distance from the projective lens 1000 to the three LCD display devices. As a result, the rear focal length of a projective lens and design difficulty for the projective lens are increased concurrently.

SUMMARY OF THE INVENTION

Accordingly, an object of the invention is to provide a projection system that automatically adjusts the focus of an optical projection device by an evaluation function applied in projective image analysis. The projective system includes a total reflection element, an image reader, an analysis system and a server device. The image reader reads the projective image guided by the optical projection device and the total reflection element and outputs a read signal. The analysis system analyzes the read image by an evaluation function and determines the clearest image on the projective plane so as to output an adjustment signal. The server device automatically performs the focal adjustment to the optical projection device based on the adjustment signal.

The invention has the advantage that the projective system can automatically adjust the focus of the optical projection device in any projective distance to produce the clearest image.

The invention is characterized in that the analysis system uses a modulation transfer function (MTF) analysis to have the clearest projective image.

BRIEF DESCRIPTION OF THE DRAWINGS

The invention can be more fully understood by reading the subsequent detailed description in conjunction with the examples and references made to the accompanying drawings, wherein.

DETAILED DESCRIPTION OF THE PREFERRED EMBODIMENT

Figure 1:
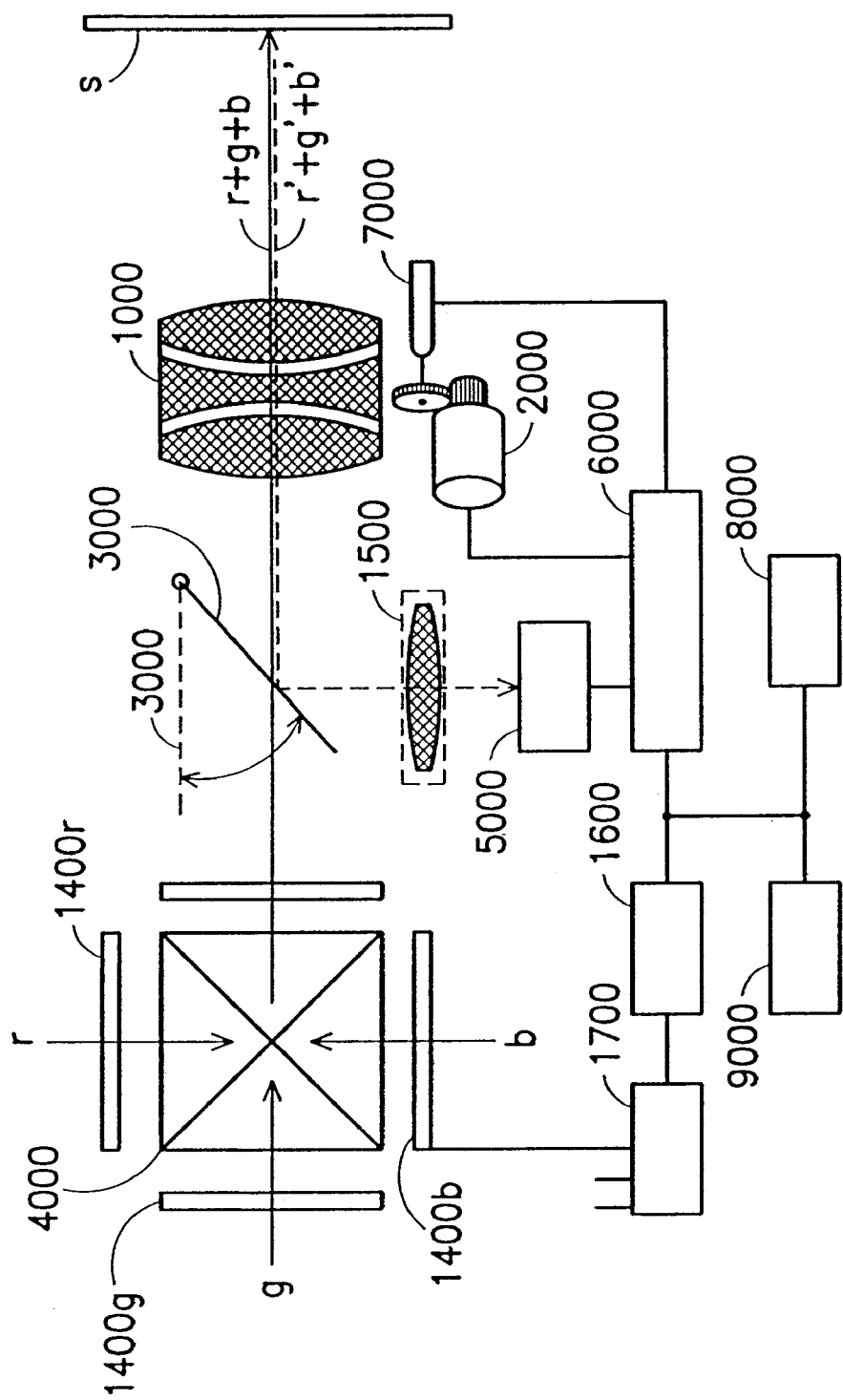
FIG. 1 shows a schematic diagram of a typically automatically focal adjustment device.
Figure 2:
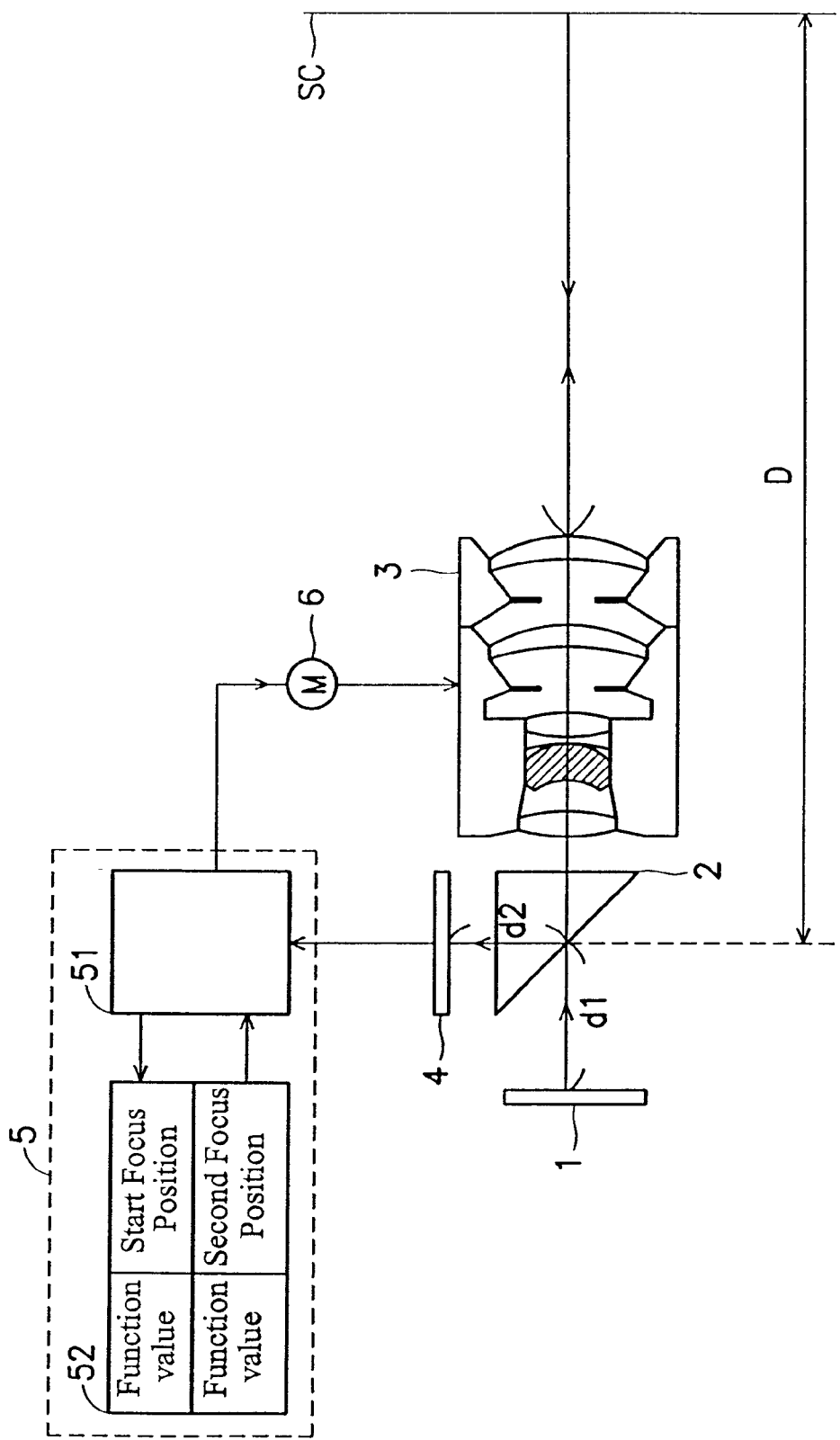
FIG. 2 shows a schematic diagram of an inventive projection system capable of automatically adjusting the focus.

As shown in FIG. 2, the projection system capable of automatically adjusting the focus of an optical projection device includes an image device 1, a total reflection element 2, an optical projection device 3, an image reader 4, an analysis device 5 and a server device 6.

Figure 3:
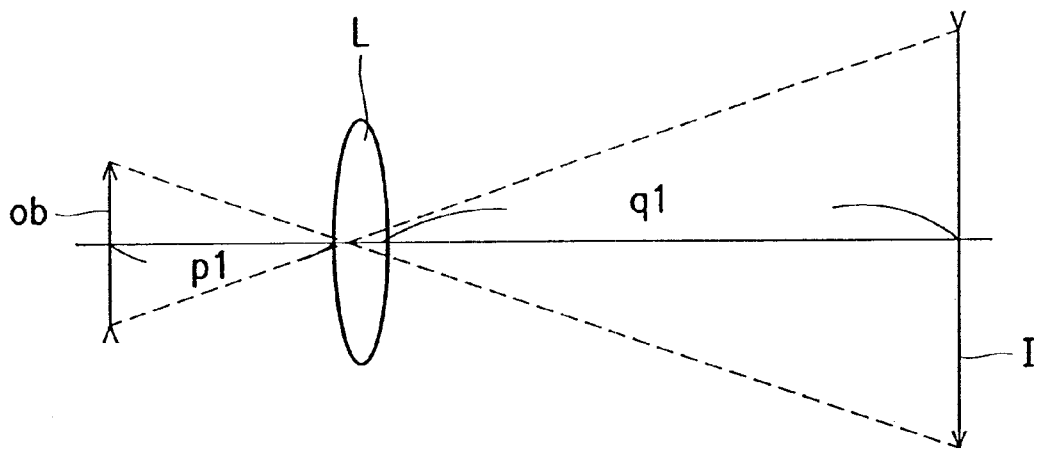
FIG. 3 shows a diagram of the irreversibility of imaging through a lens according to the invention.

In the invention, the reversibility of the imaging principle is used. As shown in FIG. 3, if an object ob is positioned on one side of a lens L, the object distance is p1. The object ob forms an image I with image distance q1 at the other side through the lens L. The optical reciprocal theory is used in FIG. 3. That is, an object with the same size as the image I is positioned at the same position as the image I. Therefore, when operating on reverse imaging, the object forms an image with the same size and position as the object ob through the lens L.

Figure 4:
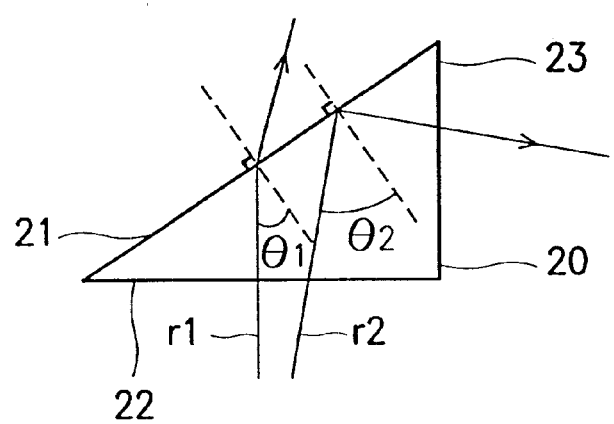
FIG. 4 shows a top diagram of a total reflection element according to the invention.

As shown in FIG. 4, using the total reflection element changes the light's direction of movement. The total reflection element includes a total reflection prism 20 with a full reflective plane 21, a first plane 22 and a second plane 23. The total reflection plane has a critical angle $\theta_c$ based on the total internal reflection principle. When the incident angle is greater than the critical angle, total reflection of the light on the total reflection plane occurs. In FIG. 4, the incident angle $\theta_1$ of a beam of light r1 is less than the critical angle, and the beam r1 emits from the plane 21 after refraction by the plane 21. Further, the incident angle $\theta_2$ of a beam of light r2 is greater than the critical angle, and the beam r2 emits from the plane 23 after total reflection by the plane 21.

Figure 5A:
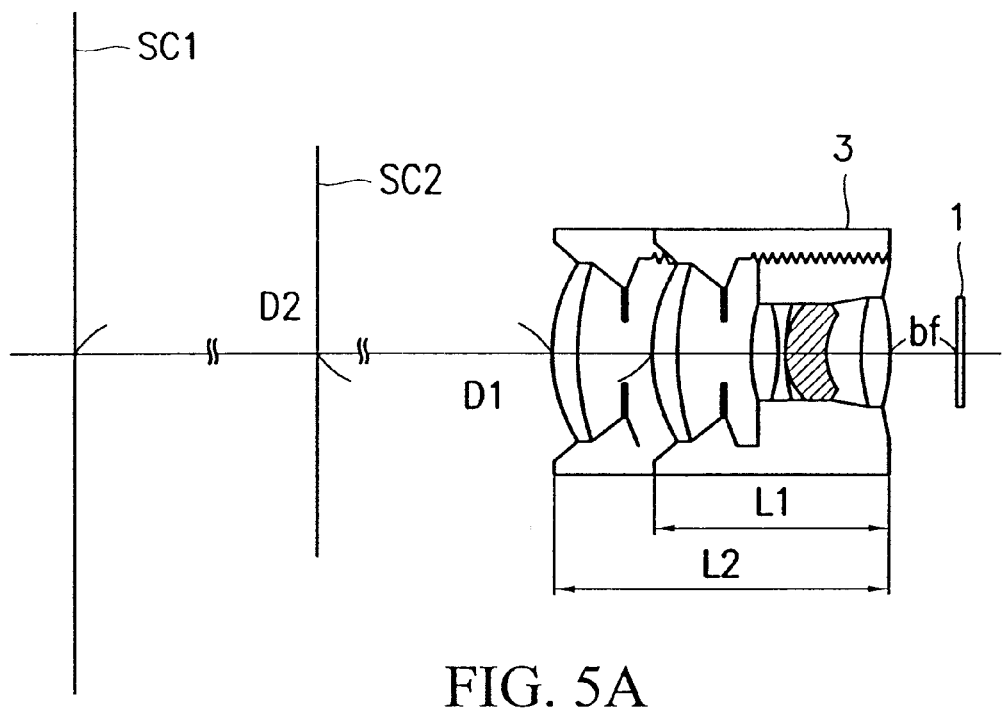
FIG. 5A shows a schematic diagram illustrating the focus of a projection device changed with the projective distance according to the invention.

As shown in FIG. 5A, the optical projection device 3 has multiple lenses and a changeable focus. The focus change for the optical projection device 3 is related to the position change for the multiple lenses. It means that the optical projection device 3 produces the length change from L1 to L2. The shortest focal length of the optical projection device 3 corresponds to a first length L1 and the longest focal length corresponds to a second length L2. The optical projection device 3 with the first L1 will images the image of the image device 1 on the plane SC1 with the shortest distance D1. The optical projection device 3 with the second length L2 will produce the image of the image device 1 on the plane SC2 with the longest distance D2. Further, the embodiment uses the projection device with a constant post-focal length. Thus, the distance bf between the image device 1 and the optical projection device 3 is a constant.

Figure 5B:
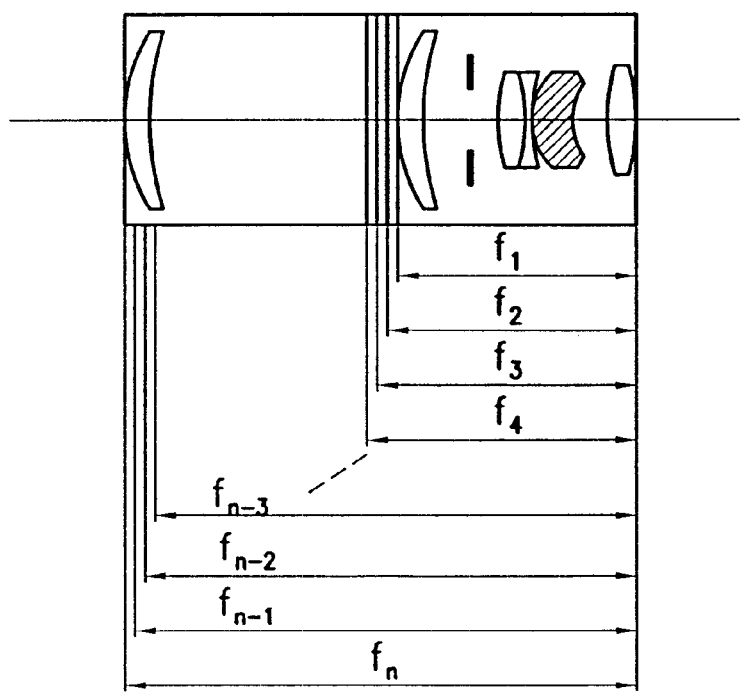
FIG. 5B shows a schematic diagram illustrating N focal positions on an optical projection device according to the invention.

As shown in FIG. 5B, the analysis system divides the length change for the optical projection device into N-1 sections with N focal length positions. The N focal length positions, which are from the first length (the least focal length) to the second length (the most focal length), are denoted as $f_1, f_2, f_3, \ldots f_N$ with respect to the first, second, third, . . . , Nth focal length positions.

When the analysis device 3 receives an automatic adjustment focus signal, a drive signal is output. According to the drive signal, the server system can set the optical projection device to the first focal length position $f_1$ as an initial position. Similarly, the optical projection device is sequentially driven onto the second, third, . . . , Nth focal length positions.

Also, the server system can set the optical projection device to the Nth focal length position $f_N$ as an initial position. Similarly, the optical projection device is sequentially driven onto the focal length positions $f_{N-1}, f_{N-21}, \ldots, f_1$.

As shown in FIG. 2, the image reader is implemented in the projection system. The distance from the image reader 4 to its projection plane SC is equal to the optical path length from the image device 1 to the projection plane SC (that is, d1+D=d2+D). After the image device 1 uses the optical projection device 3 to project an object on a plane and forms a first image, following, a second image is formed on the image reader 4 through the optical projection device 3 and the total reflection element 2. The second image is clear if the first image is clear while the second image is out of focus if the first image is out of focus.

Because the optical projection device produces N focuses, the image reader receives the N second images with different clarity and outputs a read signal for each second image received. Therefore, the image reader outputs N different read signals as the first, second, . . . , Nth read signals, respectively. The first, second, . . . , Nth read signals are individually produced with respect to the first, second, . . . , Nth focus positions of the optical projection device.

The analysis system 5 further includes an analysis computation unit 51 and a memory 52. The analysis computation unit 51 computes the N read signals with an evaluation function and stores the result in the memory 52.

Figure 6:
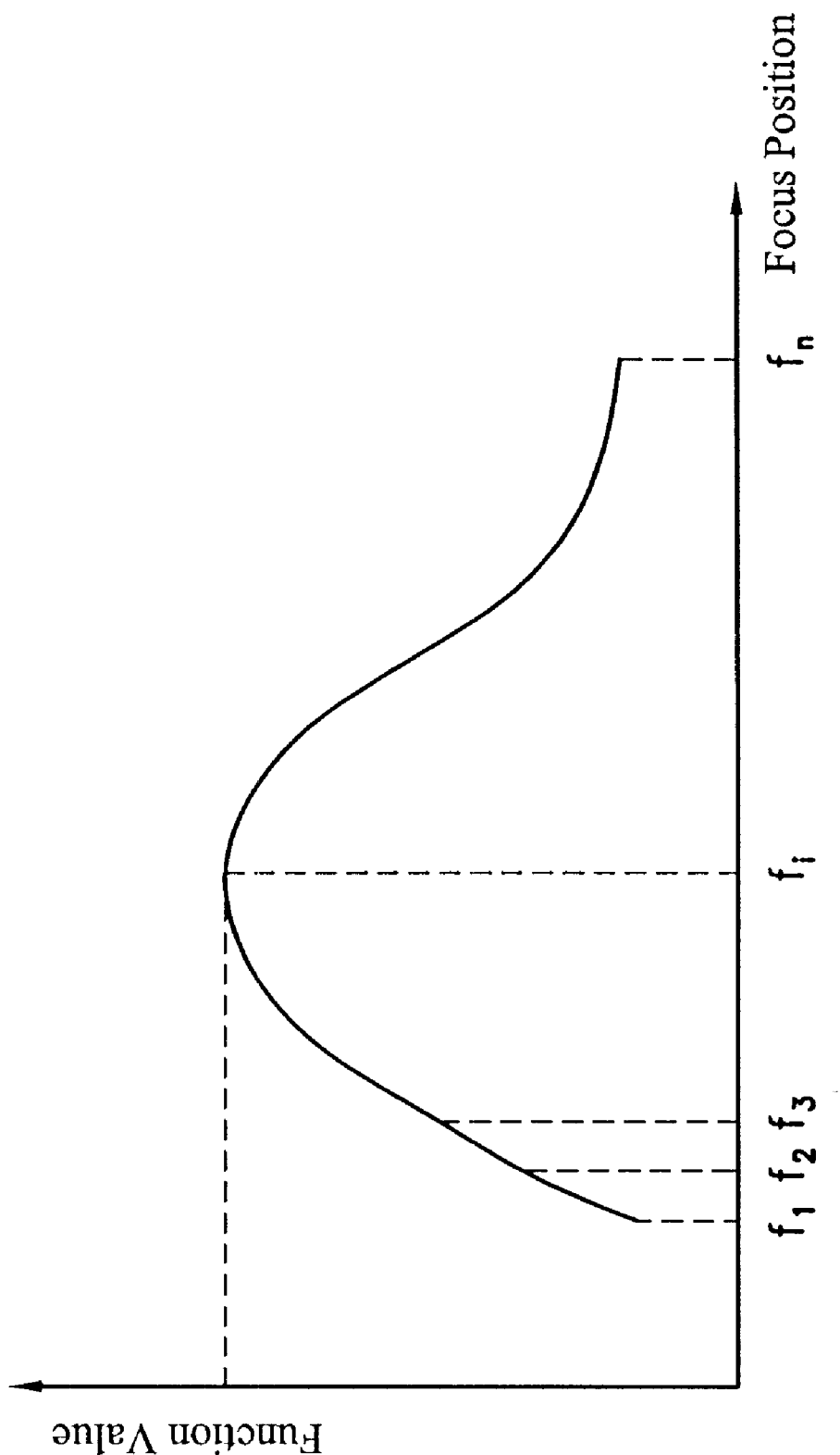
FIG. 6 shows a schematic diagram illustrating an evaluation function of a projective image according to the invention.

As shown in FIG. 6, the analysis calculates the N read signals with the evaluation function, for example, a modulation transfer function (MTF), and analyzes the N outputs from the calculation. The analysis will determine the best evaluation function value and the focus position $f_i$ from the analysis. According to the analysis result, the analysis system outputs an adjustment signal to adjust the optical projection device to the best focus position $f_i$ so that the automatic adjustment focus on the optical projection device is completed.

Figure 7:
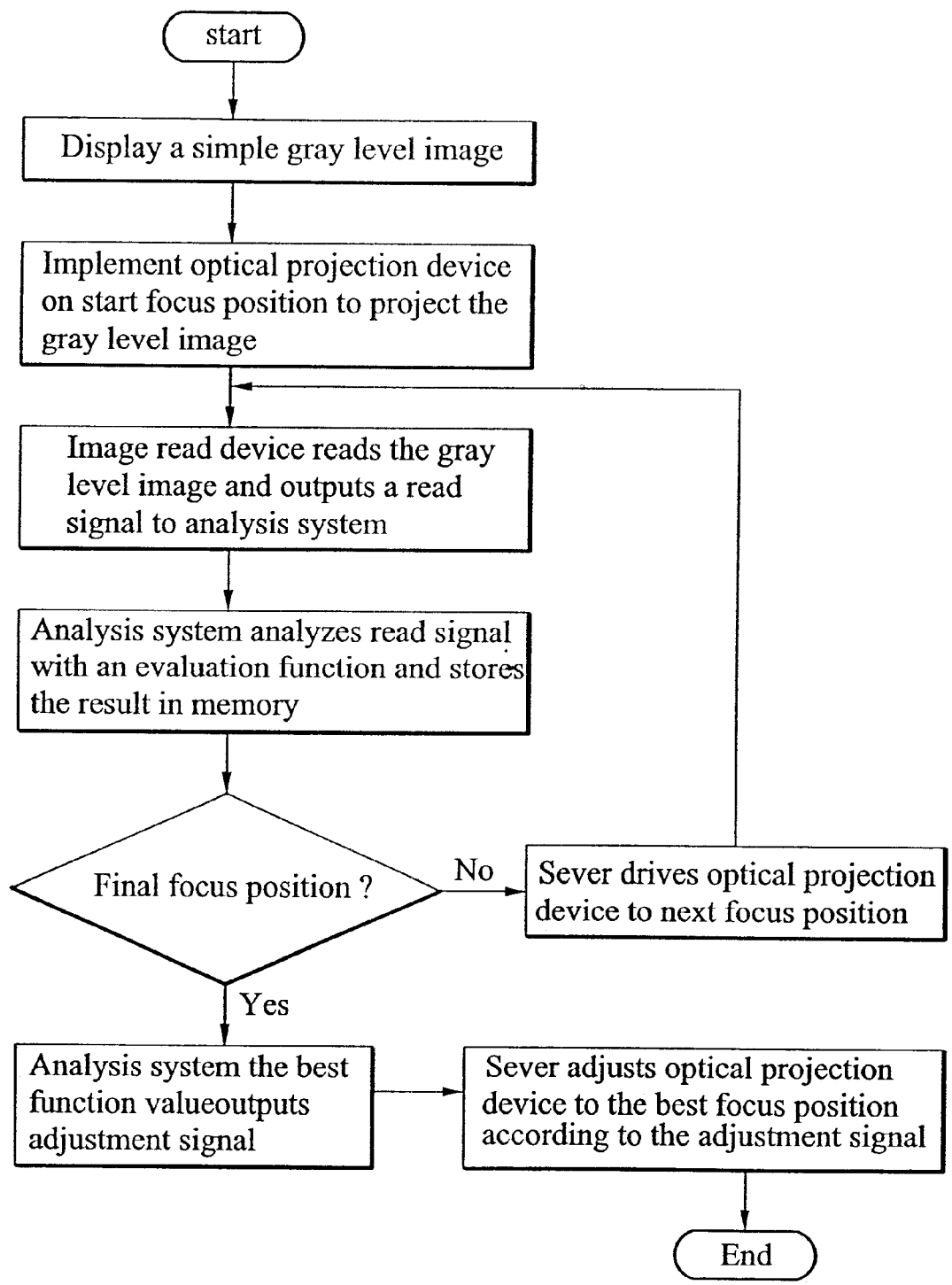
FIG. 7 is a flowchart of the automatically focal adjustment method according to the invention.

Upon the description to the inventive devices, the inventive flowchart is shown in FIG. 7. When the projection system receives the instruction for adjusting the optical projection device's focus, the inventive flowchart is started as the following steps.

Step 1, the display device displays an image, wherein the image is received from a computer, an audiovisual instrument or a simple gray level built into in the projection system.

Step 2, the optical projection device's focus is set to a start focus position and projects the image.

Step 3, the image reader reads the gray level image and outputs a read signal to the analysis system.

Step 4, the analysis system calculates the read signal by an evaluation function and stores the calculation result in a memory to determine if the optical projection device is positioned at a desired focus.

Step 5, if the optical projection device is not positioned at the desired focus, the server device drives the optical projection device to the next focus position.

Step 6, Steps 3–6 are repeated until the desired focus is reached.

Step 7, the analysis system determines the best evaluation function value and outputs an adjustment signal with the best focus position with respect to the best evaluation function value to the server device.

Step 8, the server device adjusts the optical projection device to the best focus position according to the adjustment signal so as to complete the entire operation.

Figure 8:
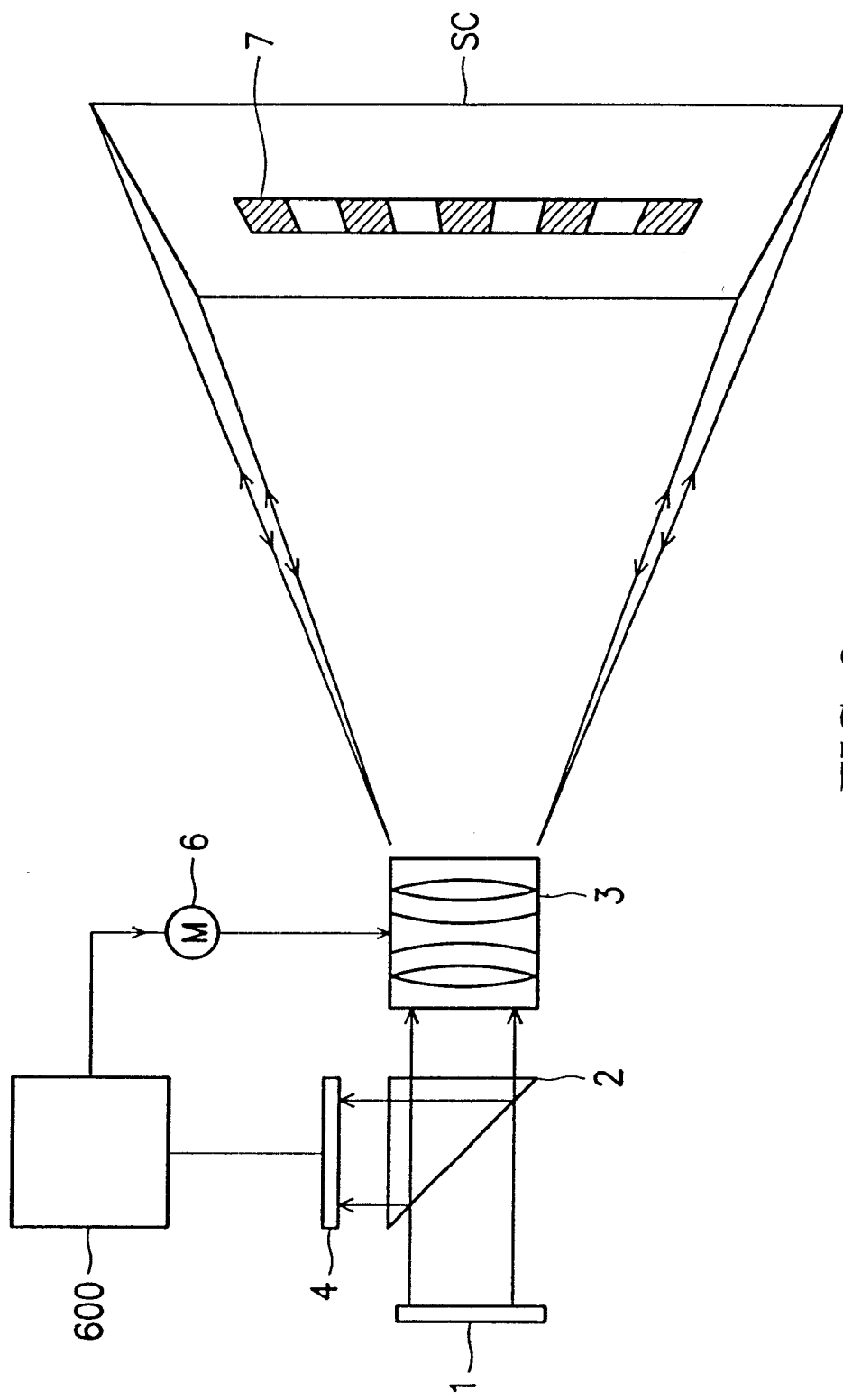
FIG. 8 shows a diagram of a projection system projecting a gray-scaled image in order to automatically adjust the focus of the projection system.
Figure 9A:
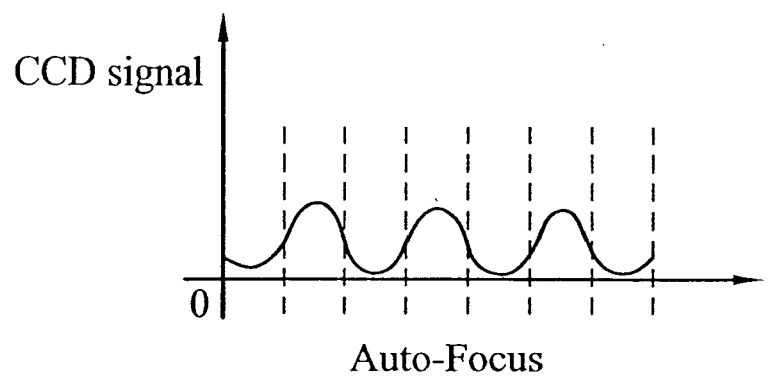
FIGS. 9A and 9B are diagrams respectively representing the read signal to be output before and after the focus is automatically adjusted.
Figure 9B:
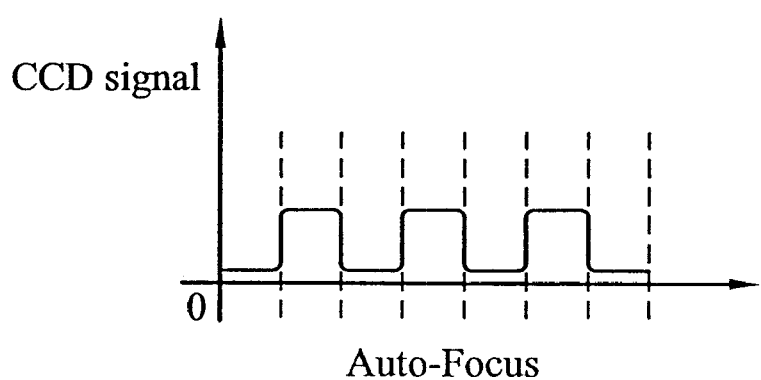

As shown in FIG. 8, the projection system can produce a simple blank-and-white interlaced line-pair image, thereby automatically adjusting the projection system's focus. As shown in FIG. 9A, the image reader, for example, linear charged couple display (CCD), Complemented Metal Oxide Semiconductor (CMOS), . . . , etc., reads the gray level image and outputs a read signal. As shown in FIG. 9B, after the analysis system completes the auto-focus analysis, the best read signal from the image reader is close to a perfect waveform.

EXAMPLE 1

Figure 10:
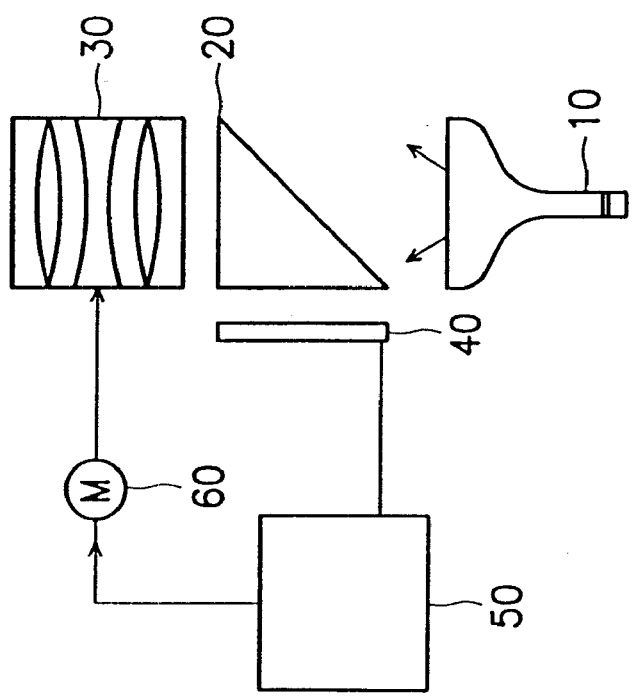
FIG. 10 is a schematic diagram of an embodiment of the focus on the inventive automatic adjustment projection system.

As shown in FIG. 10, a projector capable of automatically adjusting optical projection device's focus comprises: an image generator 10, a total reflection element 20, an optical projection device 30, an image reader 40, an analysis system 50 and a server 60.

The image generator 10, for example, a CRT, an LCD, or a laser display, produces an illumination image. The illumination image uses the optical projection device 30 through the total reflection element 20 to project on to a plane, e.g. a screen, to form a first image. The optical projection device 30 applies the first image to the image reader 40 in an equivalent optical path length to form a second image. The total reflection element can change the position of the second image.

Therefore, the analysis system 50, the server 60 and the image reader 40 can automatically adjust the focus on the optical projection device 30, thereby having a clear image on the screen.

EXAMPLE 2

Figure 11:
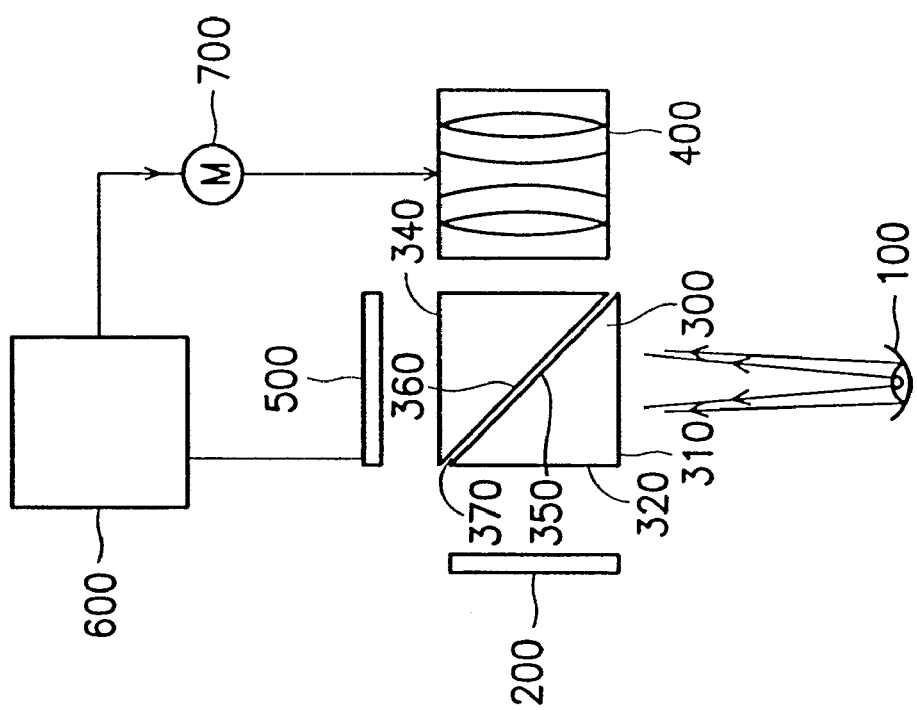
FIG. 11 is a schematic diagram of another embodiment of the focus on the inventive automatic adjustment projection system.

As shown in FIG. 11, a projector capable of automatically adjusting an optical projection device's focus comprises: a light source 100, a reflected display 200, a total reflection element 300, an optical projection device 400, an image reader 500, an analysis system 600 and a server 700.

As shown in FIG. 11, the total reflection element 300 has a first plane 310, a second plane 320, a third plane 330, a fourth plane 340, a first total reflection plane 350, a second total reflection plane 360 and a transparent medium 370. The transparent medium 370 is formed between the first total reflection plane 350 and the second total reflection plane 360t image and has a refractive index smaller than the total reflection element's material.

The light source 100 is implemented in one side of the first plane 310 of the total reflection element 300. The reflected display is implemented in one side of the second plane 320 of the total reflection element 300. The optical projection device 400 is implemented in one side of the third plane 330 of the total reflection element 300. The image reader 500 is implemented in one side of the fourth plane 340 of the total reflection element 300.

After the light source 100 emits the light, the light is totally reflected to the reflected display 200 at an angle greater than the first critical angle of the first plane 310. The reflected display 200 modulates the light and reflects the modulated light to produce the image illumination. The reflected display 200 is available from the Texas Instrument Company's digital micromirror device (DMD) or reflected liquid crystal display, such as Liquid Crystal On Silicon (LCOS). The optical projection device 400 projects the illumination image through the total reflection element 300 on a plane, e.g. a screen, to form a first plane having a clear image on the screen. The optical projection device 400 applies the first image to the image reader 500 in an equivalent light path length to form a second image. The second plane 320 of the total reflection element 300 can change the position of the second image.

Therefore, the analysis system 600, the server 700 and the image reader 500 can automatically adjust the focus of the optical projection device 400, thereby creating a clear image on the screen.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A projection system capable of automatically adjusting focus, suitable for projecting the image from an image device to a projection plane, comprising:
    a total reflection element, having a total reflection plane, a first plane and a second plane, for emitting the image from the image device through the total reflection plane and the first plane;
    an optical projection device, moving from a start focus position to a final focus position to project the emitted image from the first plane to the projection plane at a focus position between the start focus position and the final focus position and emitting the image reflected by the projection plane through the first plane, the total reflection plane and the second plane;
    an image reader, reading the emitted image from the second plane;
    a server device, coupled to the optical projection device, driving the optical projection device to move from the start focus position to the final focus position and driving the optical projection device to the next focus position when receiving an adjustment signal; and
    an analysis system, coupled to the image reader and the server device, analyzing the read image from the image reader and outputting the adjustment signal to the server device according to the focus position resulting from the analysis to drive the optical projection device to the resulting focus position.

2. The projection system as claimed in claim 1, wherein the image reader is a charged couple device (CCD).

3. The projection system as claimed in claim 1, wherein the image reader is a complemented metal oxide semiconductor (CMOS).

4. The projection system as claimed in claim 1, wherein the analysis system comprises a memory.

5. A projection system capable of automatically adjusting the focus, comprising:
    a total reflection element, having a first total reflection plane, a second total reflection plane, a first plane, a second plane, a third plane and a transparent medium formed between the first and second total reflection planes;
    a light source device, emitting light into the first plane, passing through the first total reflection plane and the second plane to send out the light;
    a reflected display, reflecting the light emitted through the second plane to be an image, the image passing through the first total reflection plane, the transparent medium, the second total reflection plane and the third plane to send out the image;
    an optical projection device, moving from a start focus position to a final focus position to project the emitted image from the third plane to a projection plane at a focus position between the start focus position and the final focus position and emit the image reflected by the projection plane through the third plane, the second total reflection plane and the fourth plane;
    an image reader, reading the emitted image from the fourth plane;
    a server device, coupled to the optical projection device, driving the optical projection device to move from the start focus position to the final focus position and driving the optical projection device to the next focus position when receiving an adjustment signal; and
    an analysis system, coupled to the image reader and the server device, analyzing the read image from the image reader and outputting the adjustment signal to the server device according to the focus position resulting from the analysis to driving the optical projection device to the resulting focus position.

6. The projection system as claimed in claim 5, wherein the image reader is a charged couple device (CCD).

7. The projection system as claimed in claim 5, wherein the image reader is a complemented metal oxide semiconductor (CMOS).

8. The projection system as claimed in claim 5, wherein the reflected display is a digital optic processor.

9. The projection system as claimed in claim 5, wherein the reflected display is a reflected liquid crystal display.

10. The projection system as claimed in claim 5, wherein the transparent medium's refractive index is smaller than the total reflection element's refractive index.

11. The projection system as claimed in claim 5, wherein the analysis system comprises a memory.

12. An auto-focus method, suitable for a projection system capable of automatically adjusting the optical projection device's focus of the projection system, comprising the steps of:
    (a) setting the optical projection device to a start focus position to project an image;

(b) reading the image by the image reader and outputting a read signal to an analysis system;

(c) analyzing the read signal by the analysis system with an evaluation function;

(d) setting the optical projection device to the next focus position;

(e) repeating steps (b) to (e) until the optical projection device reaches a final focus position;

(f) determining the best evaluation function value by the analysis system and outputting an adjustment signal with the best focus position with respect to the best evaluation function value to a server device; and (g) using the server device to adjust the optical projection device to the best focus position according to the adjustment signal so as to complete the entire operation.

13. The method as claimed in claim 12, wherein the evaluation function is a modulated transformation function.

14. The method as claimed in claim 12, further comprising display of a gray level image by the image device.

15. The method as claimed in claim 12, further comprising storing the evaluation function value in a memory.

16. A projection system capable of automatically adjusting the focus, suitable for projecting the image from an image device to a projection plane, comprising:

a total reflection plane, having a first side and a second side;

an image generation device, located at the first side of the total reflection plane, producing the image and projecting the image to the total reflection plane;

an optical projection zoom device, located at the second side of the total reflection plane, adjusting the focus from a start focus to a final focus;

an image reader, located at the second side of the total reflection plane;

a server device, coupled to the optical projection zoom device, driving the optical projection zoom device adjusting from the start focus to the final focus and to a best focus when receiving an adjustment signal; and an analysis system, coupled to the image reader and the server device, analyzing the image signal read by the image reader and outputting the adjustment signal to the server device according to the focus position from the analysis result so as to drive the optical projection zoom device to the best focus, wherein the image from the image generation device is projected on the projection plane through the total reflection plane and the optical projection zoom device and the image reflected by the projection plane passes through the optical projection zoom device and is totally reflected by the total reflection plane so as to be projected to the image reader.

* * * * *